July 31, 1928.  1,679,147
G. B. ASHWORTH
LOCOMOTIVE TRAILING TRUCK
Filed Aug. 18, 1926  2 Sheets-Sheet 2
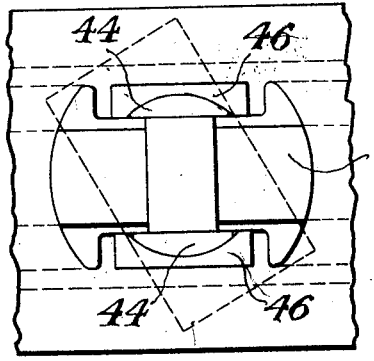
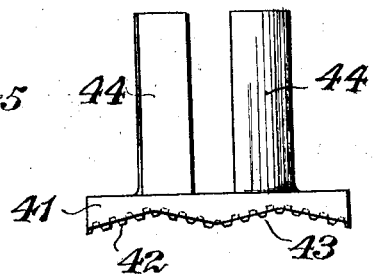
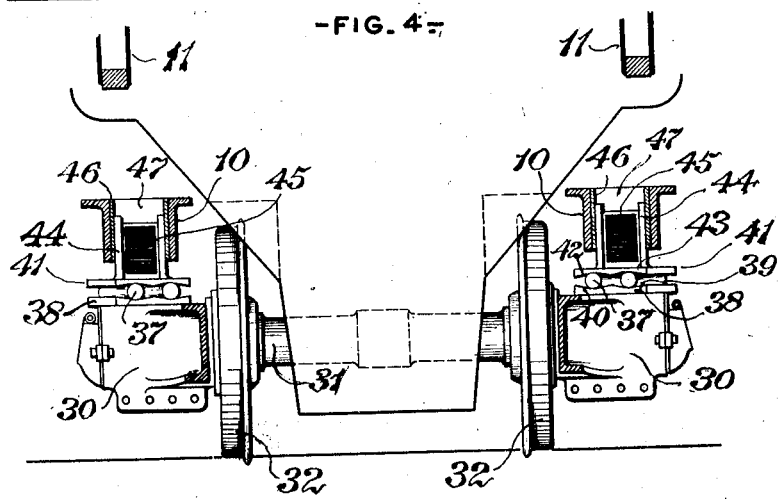
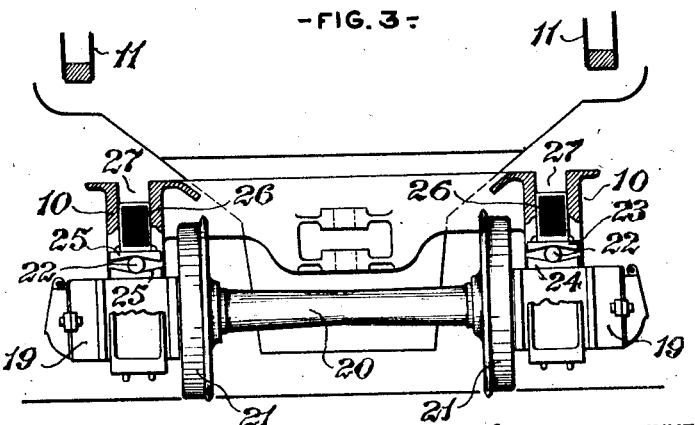
WITNESSES  INVENTOR

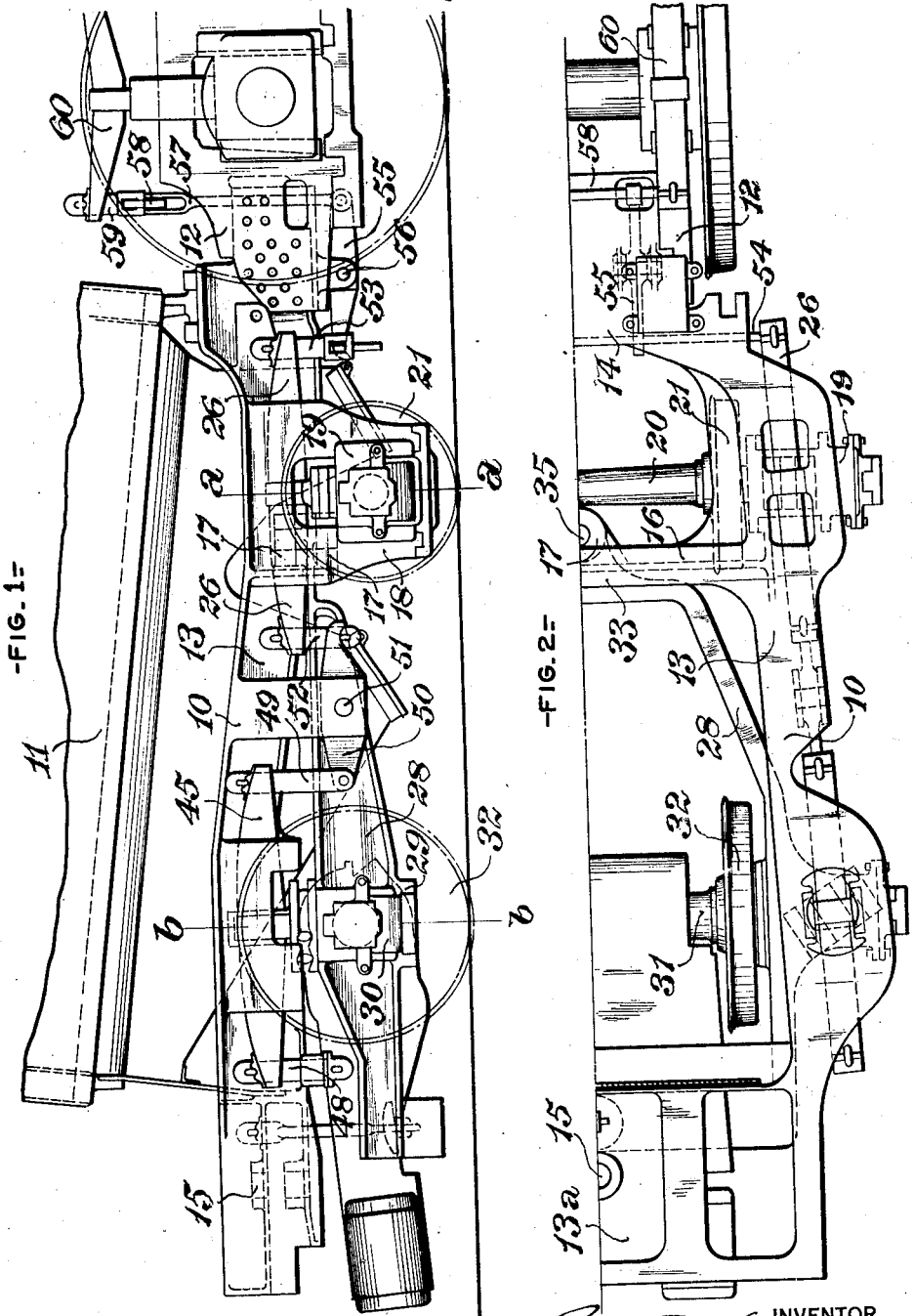

Patented July 31, 1928.

1,679,147

UNITED STATES PATENT OFFICE.

GEORGE B. ASHWORTH, OF AMSTERDAM, NEW YORK.

LOCOMOTIVE TRAILING TRUCK.

Application filed August 18, 1926. Serial No. 129,916.

My invention relates to trailing trucks for steam locomotives, and among the objects are:

To reduce the wear on rails and wheel flanges; to accomplish the maintenance of maximum speed of trains; to increase the space available for the ash pan; and to provide a construction adapted to accomplish said ends which can be economically manufactured, and which will give the maximum efficiency in service.

The improvement claimed is hereinafter fully set forth:

I have found, where four wheeled trailing trucks, swivellingly connected to the main frame, are employed, to support the weight of the rear end of a locomotive, that the rear wheels of the truck, being farthest from the swivel point, will determine the deflection of the truck, and the front wheels should have the capacity of floating laterally, to conform to the curves. Recognizing this condition, I have found that much more efficient results may be achieved by employing, instead of a four wheel trailing truck, a pair of idler wheels, capable of lateral movement, operating in pedestals formed on the rear frame or cradle, together with a two wheel trailing truck, swivellingly connected to the cradle.

In the accompanying drawings: Figure 1 is a side view, in elevation, of the rear of a locomotive, illustrating an embodiment of my invention; Fig. 2, a half plan view, of the construction shown in Fig. 1, the firebox being removed; Fig. 3, a vertical transverse section on the line $a$ $a$ of Fig. 1; Fig. 4, a similar section, on the line $b$ $b$ of Fig. 1; Fig. 5, a partial plan view, showing the rear lateral resistance device connected to the cradle; and, Fig. 6, a front elevation of the member of the rear lateral resistance device, in which the spring is seated.

In the practice of the invention, referring descriptively to the specific embodiment thereof which is herein exemplified, the rear frame or cradle (indicated as an entirety by the reference symbol, 10,) which supports the firebox, 11, is preferably an integral casting, bolted to the locomotive side frame members, 12. It comprises side members, 13, which are connected, at their front ends, by the cross tie, 14, and are connected, at their rear ends, by a transverse member, 13$^a$, in which there is formed a draw bar pocket, 15. Intermediate the front and rear ends of the side members, there is located a cross tie, 16, having two bosses, 17, which form a jaw for the reception of the front end of the truck radius bar, 33. It will be seen from Figs. 1 and 2 of the drawings, that the side members, 13, of the cradle, are disposed outside of the trailing truck wheels, and that they are provided near their front ends, with pedestals, 18, in which are fitted journal boxes, 19, which house the bearings for an axle, 20, on which are mounted idler wheels 21.

In order to permit lateral movement of the idler wheels and their axle, so that the wheels may assume the proper position, with relation to the rails, on a curved track, a clearance is provided between the sides of the pedestals, 18, and the jaws of the journals boxes, 19. Resistance devices, which permit lateral movement of the axle and wheels on a curved track, and which are adapted to restore them to normal central position, and hold them against floating on tangent track, are also provided. Each of these devices comprises a toothed roller, 22, arranged between an upper seat, 23, and a lower seat, 24. Each of the seats is formed with rack teeth disposed in opposite inclined planes, 25. By referring to Fig. 3, it will be seen that the lower seat, 24, is mounted on top of the journal box, and that the upper seat, 23, also provides a seat for the spring, 26, carrying the load on the idler wheels. The cradle side members are formed with pockets, 27, which house the springs, 26, and guide the sides of the springs, so that while the springs are held against lateral movement, the axle and wheels are free to float laterally, except for the restraint imposed by the resistance devices.

The two wheel trailing truck which is of well known construction, comprises a frame, 28, having pedestals, 29, which carry journal boxes, 30, that house the bearings for the axle, 31, on which are mounted the wheels, 32. The radius bar, 33, of the trailing truck is formed with an eye that receives the radius pin, 35, passing through the eyes in the bosses, 17, of the cross tie, 16, of the cradle.

A lateral motion resistance device is provided over each journal box of the trailing truck. Each of these devices comprises two toothed rollers, 37, a lower seat, 38, having two pairs of oppositely inclined racks, 39, 40, and an upper seat, 41, having two pairs of oppositely inclined racks, 42, 43. (See Figs. 4 and 6.)

The upper seats, 41, are each formed with a vertically projecting pair of arms, 44, which receive the springs, 45. The outer faces of the arms are made convex, to cooperate with the concave faces of the shoes, 46, welded, or otherwise secured to the sides of the pockets, 47, formed in the side members of the cradle.

It will be obvious that the shoes, which take up the wear caused by the rise and fall of the truck with relation to the cradle, can readily be renewed when they become worn. It will be further obvious that the lateral motion resistance devices of the trailer truck, permit proper displacement of the wheels, to correspond with curves in the track, and operate to restore the wheels to normal central position on tangent track.

The system for equalizing the weights borne by the main frame, cradle, and trailing truck, is as follows: The rear ends of the springs, 45, are attached, through hangers, 48, to the side members of the cradle, while their front ends connect, through hangers, 49, to the rear ends of equalizers, 50, fulcrumed by pins, 51, to the side members of the cradle. The front ends of the equalizers, 50, connect, through hangers, 52, with the rear ends of springs, 26. The front ends of the springs, 26, connect, through the hangers, 53, with the transverse equalizer, 54, on which the rear ends of equalizers, 55, fulcrumed, by pins, 56, to the main side frame members, rest. The front ends of the equalizers, 55, are connected to hangers, 57, which hang on a transverse equalizer, 58. The outer ends of the equalizer, 58, are connected to hangers, 59, which are attached to the rear driving springs, 60.

So far as I am aware, it is broadly novel to support the weight of the rear end of a steam locomotive on a cradle, supported both by a trailing truck and on idler wheels mounted in pedestals formed in the cradle frame. It is further broadly novel to dispose the cradle side frame members outside of the wheels of the truck, thus providing a much greater space for the ash pan than has heretofore been available.

The improved construction possesses the important advantage that it enables the trailing truck wheels and the idler wheels to independently assume the proper position on curves, and returns them to normal central position on tangent track, thus reducing, to a minimum, the wear on the rails and wheel flanges, and enabling the maintenance of maximum speed of trains.

I claim as my invention and desire to secure by Letters Patent:

1. In a locomotive, the combination of a main frame; a cradle secured thereto; a pair of idler wheels, mounted on an axle rotating in bearings in the cradle; means for permitting lateral movement of said idler wheels on curves; and a trailing truck, connected to said cradle.

2. In a locomotive, the combination of a main frame; a cradle rigidly secured thereto; pedestals carried by the cradle; a pair of idler wheels, mounted on an axle rotating in bearings in the pedestals; means permitting lateral movement of said idler wheels on curved track; and a trailing truck connected to said cradle.

3. In a locomotive, the combination of a main frame; a cradle secured thereto; a pair of idler wheels, mounted on an axle rotating in bearings in the cradle; means for normally holding said wheels central, but permitting lateral movement thereof on curved track; and a trailing truck connected to said cradle.

4. In a locomotive, the combination of a main frame; a cradle secured thereto; a pair of idler wheels, mounted on an axle rotating in bearings in the cradle; means for normally holding said wheels central, but permitting lateral movement thereof on curved track; a trailing truck, swivellingly connected to said cradle; a frame for said truck; pedestals carried by said truck frame; a pair of wheels mounted on an axle rotating in bearings in the pedestals; and means, carried by the trailing truck, for normally holding the wheels central, but permitting radial adjustment thereof on curved track.

5. In a locomotive, the combination of a main frame; a cradle secured thereto, and having side sills, each provided with a pedestal, the said sills being disposed outside of the wheels of a trailing truck; a pair of idler wheels, mounted on an axle, rotating in bearings in the pedestals; and a trailing truck, connected to the cradle.

6. In a locomotive, the combination of a main frame; a cradle secured thereto, and having side sills, each provided with a pedestal, the said sills being disposed outside of the wheels of a trailing truck; a pair of idler wheels, mounted on an axle rotating in bearings in the pedestals; means for permitting lateral movement of the idler wheels on curved track; and a trailing truck, connected to the cradle.

7. In a locomotive, the combination of a main frame; a cradle secured thereto, and having side sills, each provided with a pedestal, the said sills being disposed outside of the wheels of a trailing truck; a pair of idler wheels, mounted on an axle rotating in bearings in the pedestals; means for normally holding the idler wheels central, but permitting lateral movement thereof on curved track; and a trailing truck, swivellingly connected to said cradle.

8. In a locomotive, the combination of a main frame; a cradle secured thereto, and having side sills, each provided with a pedestal, the said sills being disposed outside of the wheels of a trailing truck; a pair of idler wheels, mounted on an axle rotating in bearings in the pedestals; means for normally holding the idler wheels central, but permitting lateral movement thereof on curved track; and a trailing truck, swivellingly connected to said cradle, said truck comprising a frame, pedestals carried by the frame, and a pair of wheels mounted on an axle rotating in bearings in the pedestals; and means for normally holding the wheels central, but permitting radial adjustment thereof on curved track.

9. In a locomotive, the combination of a main frame; a cradle secured thereto, and having side sills, each provided with a pedestal, the said sills being disposed outside of the wheels of a trailing truck; a pair of idler wheels, mounted on an axle rotating in bearings in the pedestals; a cross tie, connecting the side sills, and disposed intermediate the length thereof, said cross tie having means for swivel connection to the radius bar of a trailing truck; and a trailing truck having a radius bar connected to said cross tie.

10. In a locomotive, the combination of a main frame; a cradle secured thereto, and having side sills, each provided with a pedestal, the said sills being disposed outside of the wheels of a trailing truck; a pair of idler wheels, mounted on an axle rotating in bearings in the pedestals; means for normally holding the idler wheels central, but permitting lateral movement thereof on curved track; a cross tie connecting the side sills, and disposed intermediate the length thereof, said cross tie having means for swivel connection to the radius bar of a trailing truck; and a trailing truck, having a radius bar connected to said cross tie.

11. In a locomotive, the combination of a main frame; a cradle secured thereto, and having side sills, each provided with a pedestal, the said sills being disposed outside of the wheels of a trailing truck, and each of the sills being provided with a pocket to house one of the springs carrying the weight on the idler wheels; a pair of idler wheels, mounted on an axle rotating in bearings in the pedestals; and a trailing truck, connected to the cradle.

12. In a locomotive, the combination of a main frame; a cradle secured thereto, and having side sills, each provided with a pedestal, each of the sills being provided with a pocket to house one of the springs carrying the weight on the wheels of a trailing truck; a pair of idler wheels, mounted on an axle rotating in bearings in the pedestals; and a trailing truck, connected to the cradle.

13. In a locomotive, the combination of a main frame; a cradle secured thereto, and having side sills, each provided with a pedestal, each of the sills being provided with a pocket, to house one of the springs carrying the weight on the idler wheels, and a pocket, to house one of the springs carrying the weight on the trailing truck wheels; a pair of idler wheels, mounted on an axle rotating in bearings in the pedestals; and a trailing truck, connected to the cradle.

14. In a locomotive, the combination of a main frame; a cradle secured thereto, and having side sills, each provided with a pedestal, each of the sills being provided with a pocket, to house one of the springs carrying the weight on the wheels of the trailing truck; means for taking up wear caused by movement of the sides of the springs; a pair of idler wheels, mounted on an axle rotating in bearings in the pedestals; and a trailing truck, connected to the cradle.

15. In a locomotive, the combination of a main frame; a cradle secured thereto; pedestals, carried by the cradle; a pair of idler wheels, mounted on an axle rotating in bearings in the pedestals; means for normally holding said wheels central, but permitting lateral movement thereof on curved track; a trailing truck, connected to said cradle; and means for equalizing the weight of the rear end of the locomotive with that borne by the driving wheels, and proportioning it between the idler and trailing truck wheels.

16. In a locomotive, the combination of a main frame; a cradle secured thereto; pedestals, carried by the cradle; a pair of idler wheels, mounted on an axle rotating in bearings in the pedestals; geared roller means for normally holding said wheels central, but permitting lateral movement thereof on curved track; and a trailing truck, connected to said cradle.

17. In a locomotive, the combination of a main frame; a cradle secured thereto; pedestals, carried by the cradle; a pair of idler wheels, mounted on an axle rotating in bearings in the pedestals; geared roller means, for normally holding said wheels central, but permitting lateral movement thereof on curves; and a trailing truck, connected to said cradle, and comprising a frame, pedestals, carried by the frame and a pair of wheels mounted on an axle rotating in bearings in the pedestals; and geared roller means for normally holding the wheels central but permitting radial adjustment thereof on curved track.

GEORGE B. ASHWORTH.